Sept. 26, 1961  
J. I. BABBITT  
3,001,412  
LOST MOTION CONNECTION BETWEEN SPROCKET  
WHEEL AND VALVE OPERATING WHEEL  
Filed March 6, 1959
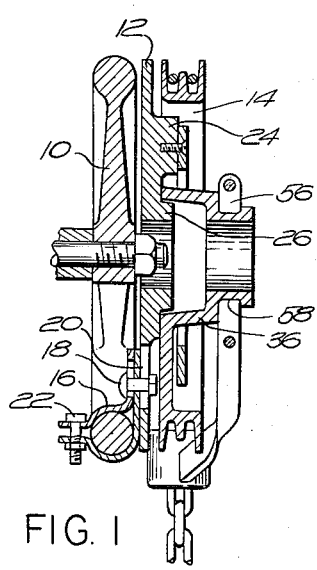
FIG. 1
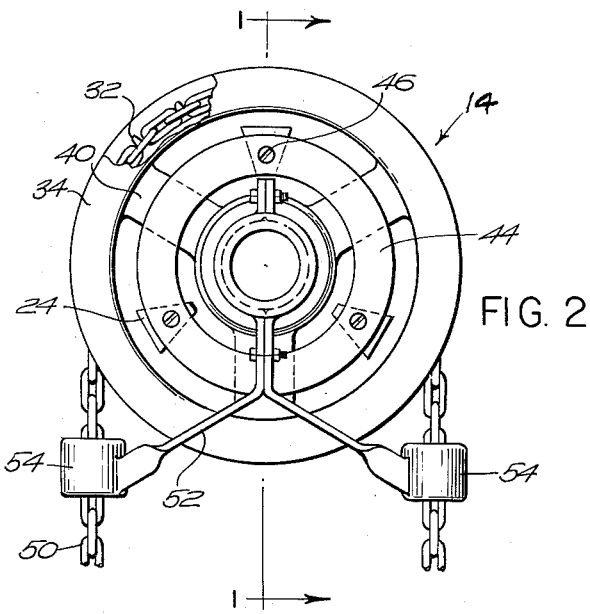
FIG. 2
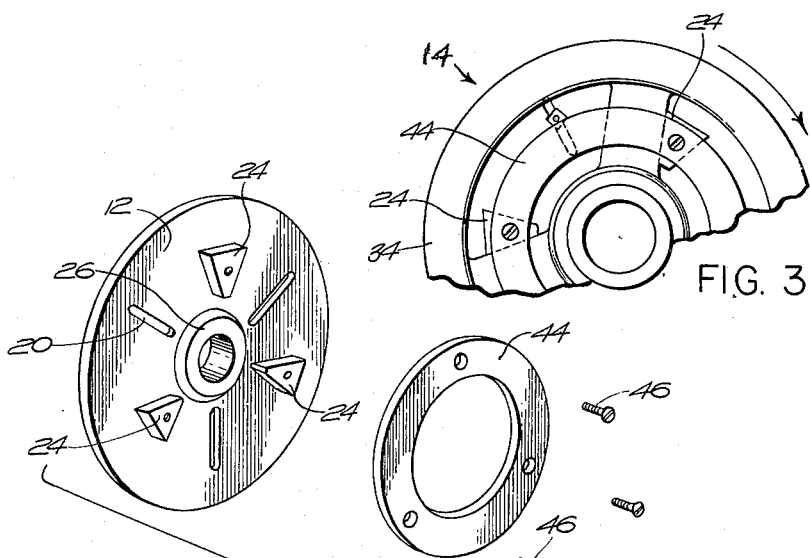
FIG. 3
FIG. 4
*INVENTOR.*
JOHN I. BABBITT
BY Morse & Altman
ATTORNEYS

United States Patent Office 3,001,412
Patented Sept. 26, 1961

3,001,412
LOST MOTION CONNECTION BETWEEN SPROCKET WHEEL AND VALVE OPERATING WHEEL
John I. Babbitt, South Westport, Mass., assignor to Babbitt Steam Specialty Co., New Bedford, Mass., a corporation of Massachusetts
Filed Mar. 6, 1959, Ser. No. 797,718
2 Claims. (Cl. 74—243)

This invention relates to an attachment for a circular valve handle, the attachment including a sprocket wheel and chain by which the valve can be readily operated when located in an inconvenient place such as at a height above the floor sufficient to put it beyond ordinary reach. According to the present invention, the attachment is also constructed to be adjustable for attachment to valve handles of different sizes and to furnish means for starting a stuck valve or valve handle. For this purpose a lost motion device is provided between the chain-operated sprocket wheel and the valve handle so that the wheel can be operated to impart impulses of the nature of hammer blows to the valve handle to break it loose when it has become "frozen" by excessive pressure, rust, scale or the like.

For a more complete understanding of the invention, reference may be had to the following description thereof and to the drawing of which—

FIGURE 1 is a section view, on the line 1—1 of FIGURE 2, of an embodiment of the invention mounted on a valve-operating wheel;

FIGURE 2 is a front elevation of the same;

FIGURE 3 is a fragmentary front elevation showing the relatively movable members in a different relative position; and FIGURE 4 is an exploded perspective view of the member to be secured to the valve-operating wheel.

The attachment shown on the drawing as secured to a valve-operating wheel 10 consists of two principal parts, namely, a member or disk 12 and a sprocket wheel 14 which is coaxial with the disk. The disk 12 is secured directly to the valve-operating wheel 10 by any convenient means such as calmps 16 which surround the rim of the valve-operating wheel 10 and are adjustably secured as by bolts 18 to the disk 12, each bolt passing through a radial slot 20 in the disk. The slots 20 facilitate attachment of the disk to valve-operating wheels of different sizes. As shown, each of the calmps 16 may conveniently be composed of two pieces of strap iron which are held together by bolts 18 and 22. Projecting forward from the front face of the disk 12 are a number of lugs 24, threee such lugs being shown on the drawing. These lugs are equidistant from the axis of the disk and are equiangularly spaced around the axis. A greater or lesser number of such lugs may be employed as found convenient or desirable. At the center of the disk a hollow hub member 26 projects forward.

The sprocket wheel 14 has a series of lugs or sprockets 32 projecting radially from the rim 34 thereof. The sprocket wheel 14 also has a hollow hub member 36 the rear end of which may conveniently fit over a hub member 26 of the disk 12, as indicated in FIGURE 1. The hubs 26 and 36 are made hollow so that the attachment can be used on valves having a "rising stem," that is, a stem which moves axially through the hand wheel 10 when the latter is rotated.

Connecting the rim 34 with the hub 36 are a number of spokes 40. Preferably, the number of spokes is equal to the number of lugs 24 and they are equiangulalry arranged about the axis of the sprocket wheel. As shown in FIGURE 2 of the drawing, the spacing between successive spokes 40 is materially greater than the angle subtended by any one of the lugs 24. When the sprocket wheel is in place against the disk 12, the spokes are in a common plane with the lugs 24 so that when the sprocket is rotated in either direction relatively to the disk 12, the spokes simultaneously engage respective lugs and thus put a definite limit to the angle of relative rotation of the sprocket and disk. To hold these members in assembled relation, an annular ring 44 is mounted in front of the spokes 40 and is secured to the lugs 24 by suitable screws or bolts 46. The ring 44 holds the sprocket wheel against axial movement relative to the disk 12.

To operate the attachment a loop or chain 50 is hung on the wheel so as to pass around half of the periphery thereof, alternate links of the chain engaging over the sprockets 32 to prevent slipping of the chain on the wheel. A chain guide 52 may be provided to keep the chain from riding or jumping out of the groove of the rim 34. The guide 52 may comprise a pair of eyes 54 on the ends of two arms which are joined to a neck 56, the latter being loosely mounted in a peripheral groove 58 in the hub member 36 of the wheel 14.

The wheel 14 is freely rotatable with respect to the disk 12 except that when the lugs 24 simultaneously engage the spokes 40, the wheel and disk must turn together. In the mechanism illustrated on the drawing, there is a lost motion between these two members of about 70° so that if the direction of rotation of the wheel 14 is reversed at any time, it can rotate approximately 70° before it picks up the disk again to rotate therewith. This lost motion between the wheel and the disk is useful in starting a valve wheel which may have been stuck by scale, excess pressure or other cause. If, for example, it is desired to open the valve when the valve is stuck, the wheel 14 may first be turned to the position shown in FIGURE 3 wherein the spokes 40 engage all the lugs 24. A sharp pull on the chain 50 to rotate the wheel in the opposite direction (the valve-opening direction) will cause the spokes 40 to strike simultaneously against the lugs 24 with an impact equivalent to a hammer blow. This can be repeated until the valve is started.

I claim:

1. An attachment for a valve-operating wheel, comprising a disk, means for securing said disk to said wheel coaxially therewith, a series of lugs equiangularly arranged on a face of said disk about the axis thereof, a sprocket wheel coaxial with said disk and rotatable relatively thereto, said sprocket wheel having a rim with sprockets thereon, a hub, and a series of spokes equal in number to said series of lugs and similarly spaced around the axis, the angular spacing between successive spokes being materially greater than the angle subtended by any one of said lugs, an endless chain meshing with said sprockets, and means holding said sprocket wheel against axial movement relative to said disk, said spokes and lugs being in a common plane whereby relative rotation between said sprocket wheel and disk is limited.

2. An attachment for a valve-operating wheel, comprising a disk having a series of lugs mounted on the front face thereof equiangularly about the axis thereof, a sprocket wheel mounted coaxially in front of said disk and rotatable relatively thereto, said sprocket wheel having a series of spokes in a common plane with said lugs and similarly arranged with respect to the axis whereby the angle of relative rotation of said disk and wheel is limited, an endless chain meshing with said sprockets, and means for holding said wheel from axial movement relative to said disk, said means consisting of a ring secured to said lugs in front of said spokes.

References Cited in the file of this patent

UNITED STATES PATENTS

| | | |
|---|---|---|
| 783,007 | Allen et al. | Feb. 21, 1905 |
| 1,395,330 | Babbitt | Nov. 1, 1921 |
| 1,731,314 | Mohr | Oct. 15, 1929 |
| 1,931,751 | Brown et al. | Oct. 24, 1933 |
| 2,387,254 | Gigger | Oct. 23, 1945 |